United States Patent [19]

Reinhardt et al.

[11] 4,046,861
[45] Sept. 6, 1977

[54] PROCESS FOR THE PRODUCTION OF FERROCYANIDE BLUE

[75] Inventors: Helmut Reinhardt, Rodenkirchen; Everhard Gratzfeld, Wesseling; Eva Clausen, Rodenkirchen, all of Germany

[73] Assignee: Deutsche Gold- und Silber-Scheideanstalt vormals Roessler, Frankfurt, Germany

[21] Appl. No.: 620,273

[22] Filed: Oct. 7, 1975

[30] Foreign Application Priority Data

Nov. 8, 1974  Germany ............................ 2453014

[51] Int. Cl.$^2$ .............................................. C01C 3/12
[52] U.S. Cl. .................................... 423/367; 106/304
[58] Field of Search ......................... 423/367; 106/304

[56] References Cited

U.S. PATENT DOCUMENTS

| | | | |
|---|---|---|---|
| 3,764,659 | 10/1973 | Reinhardt et al. | 423/367 |
| 3,864,453 | 2/1975 | Reinhardt et al. | 423/367 |
| 3,915,733 | 10/1975 | Reinhardt et al. | 106/304 |
| 3,985,571 | 10/1976 | Reinhardt et al. | 423/367 X |

*Primary Examiner*—Earl C. Thomas
*Attorney, Agent, or Firm*—Cushman, Darby & Cushman

[57] ABSTRACT

Ferrocyanide blue is produced by reacting an aqueous ferrocyanide solution with an iron II salt and subsequently aging of the precipitate at elevated temperature and optionally at elevated pressure as well as oxidation in acid medium. The improvement comprises simultaneously leading the aqueous solution of ferrocyanide and the ferrous salt solution into a water receiver, whereby optimum mixing occurs during the precipitation and whereupon the precipitate formed, the so-called white stage is aged in known manner directly in the reaction medium in the presence of the salts formed in the reaction at elevated temperature and optionally under pressure and likewise in known manner is converted into Berlin blue by oxidation in acid medium.

14 Claims, 2 Drawing Figures

PROCESS FOR THE PRODUCTION OF FERROCYANIDE BLUE

It is known to produce ferrocyanide blue by precipitation of the ferroferrocyanide (white stage, Berlin white) from ferrocyanide salt solutions such as potassium, sodium or calcium ferrocyanide and ferrous salt solutions such as ferrous sulfate or ferrous chloride, aging the white state at elevated temperature and oxidation of the white stage to ferriferrocyanide (ferrocyanide blue, Berlin blue).

In known processes either the iron II salt solution is placed in the precipitation container and the white stage precipated by the addition of the ferrocyanide solution or in reverse the ferrocyanide salt solution is present and the white stage precipitated with iron II salt solution. According to the desired primary particle size, the precipitation occurs at different temperatures, mostly at 50°-80° C.

The precipitated Berlin white previously has been freed as far as possible by decantation with water from soluble reaction salts formed in the precipitation which unfavorable influence the particle shape and particle size in the further course of the process. Because of the gel-like character of the Berlin white there is needed for this a larger amount of tank space and time. (Kittel, Pigmente, 3rd edition 1960).

On the contrary it has now been found that there can be obtained a ferrocyanide blue with very uniform almost spherical and slightly agglomerated particles and thereby plainly improved pigment properties if the ferrocyanide in the form of its aqueous solution is introduced simultaneously with the ferrous salt solution into a water receiver, whereby optimum mixing occurs during the precipitation and whereupon the precipitate formed, the so-called white stage, is aged in known manner directly in the reaction medium in the presence of the salts formed in the reaction at elevated temperature and optionally under pressure and likewise in known manner is converted into Berlin blue by oxidation in acid medium.

Thus the aging can be carried out at 80 to 120° C and at a pressure of 1.0 to 2.0 atmosphere.

Conventional oxidizing agents can be used to form the ferrocyanide blue. For example there can be used an alkali metal chlorate, e.g. sodium chlorate or potassium chlorate, an alkali metal chromate, e.g sodium chromate or potassium chromate, hydrogen peroxide, etc.

The oxidation can be carried out at conventional temperatures, e.g. 20° to 100° C and acid pH, e.g. pH of 0.5 to 2.0.

Unless otherwise indicated all parts and percentages are by weight.

As ferrocyanides there can be used both alkali ferrocyanides such as potassium ferrocyanide or sodium ferrocyanide and calcium ferrocyanide. Besides it has further been found that mixtures of potassium and sodium ferrocyanide are very well suited for the production of ferrocyanide blue according to the process of the invention. Preferred is the mixture of equal parts of sodium and potassium ferrocyanide.

As calcium ferrocyanide solutions there can preferably be added solutions which according to their method of preparation still contain 1 mole of calcium chloride per mole of calcium ferrocylanide.

Since in the use of the latter solutions considerably more soluble salts are present in the white stage, the possiblity by the process of the invention of eliminating the removal of the soluble salts an especial advantage.

As ferrous salts there are added water soluble salts such as ferrous sulfate or ferrous chloride, the latter preferably in the form of the so-called pickling solution.

The concentrations of the reaction solutions for the ferrocyanide salt are 100–400 grams per liter of solution and for the ferrous salt are 60–400 grams per liter of solution.

The amounts of water which are present before introducing the solutions of ferrocyanide and ferrous salt should be greater than 10 weight % of the amount of the white stage formed. It is favorable for the amount of water to be about 20 to 40 weight % based on the amount of the weight stage.

For adjustment of the depth of color either the ferrocyanide salt solution or the iron II salt solution is added in slight excess over the equivalent amounts. Thus there can be added 0.5–20 grams of ferrocyanide, preferably 7 grams based on 1 liter of white stage suspension, over the equivalent amount of ferrous salt. Likewise there can be used 0.3–3 grams, preferably 0.6 grams of iron II ion per liter of white stage suspension, over the equivalent amount of ferrocyanide.

As is known, a qualitative high quality ferrocyanide blue must contain a fixed amount of alkali such as potassium or ammonium or specific amounts of both of these alkali metals. (The ammonium group being treated as an alkali metal.) In using potassium ferrocyanide solutions the alkali metal is contained in the ferrocyanide solution.

If mixtures of potassium and sodium ferrocyanide are used, alkali salts, e.g. sodium or potassium salts but preferably ammonium salts, are added in the precipitation or after the precipitation but before the aging in order to improve the color properties of the pigment. Such salts include for example the sulfates and chlorides. In contrast to known precipitation processes the amount of ammonium salt can be reduced substantially.

Thereby the main amount of ammonium, i.e. 80–85% is built into the white stage structure. Waste water problems cannot occur through this.

The amount of ammonium ion (or other alkali metal ion) based on one mole of ferrocyanide ion is between 1/20 and ½ mole, preferably at 1/6–⅓ mole. Naturally it is also possible to increase the amount of ammonium ion, however, the named amounts are preferred.

In addition of sodium ferrocyanide or calcium ferrocyanide as the starting material, potassium ions or ammonium ions or both are added in the white stage precipitation. However, it is also possible to add these alkali compounds before or during the aging. Typical potassium compounds include inorganic or organic salts such as potassium chloride, potassium acetate, potassium propionate, potassium benzonate, potassium sulfate, ammonium salts of the same carbons can be used.

The addition in the white stage precipitation can take place in the iron II salt solution.

In any case the addition of alkali salt must be so regulated that in use of calcium ferrocyanide there cannot occur any formation of difficulty soluble potassium-calcium-ferrocyanide.

If sodium or calcium ferrocyanide is employed as starting material in place of potassium ferrocyanide, the amount of potassium which is added during the process of the invention is smaller than the amount of potassium which is contained in the potassium ferrocyanide.

The process of the invention thus results in the possibility of obtaining a pigment with definitely improved properties using less potassium salts than previously. Thus there were used 1-3 moles of potassium salt based on the calcium or sodium ferrocyanide.

The pH value of the reaction solution for the solution of ferrocyanide is between 3.5 and 13, preferably with calcium ferrocyanide at about 10, while in comparison with sodium or potassium ferrocyanide as well as mixed salts of sodium and potassium ferrocyanide preferably at about 4.5. The pH values of the iron II salt solutions are 0.8 to 6, preferably in a precipitation with calcium ferrocyanide around 1.0 to 1.5 and in precipitations with alkali ferrocyanides at around 2.5 to 3.

The pH value of the ferrocyanide and the iron II salt solutions must be so formulated with each other that before, during and after the reaction no precipitation of iron hydroxide occurs. In the preferred named pH values it is also the case that precipitation does not occur.

The temperature in the precipitation is generally 10°-80° C preferably 20°-25° C.

Under optimum stirring is understood that the reactants are brought together in desired form and the intensity of stirring is not so great that damage can occur to the precipitated product.

In connection with the precipitation the white stage (alkali-ferroferrocyanide) is aged by heating, e.g. at 80° to 120° C and a pressure of 1-2 atmosphere absolute for 1-2 hours.

The Berlin white obtained is oxidized in conventional manner, e.g. with sodium or potassium chlorate or hydrogen peroxide in acid medium to form Berlin blue (alkali ferriferrocyanide) and further treated in known manner.

As "simultaneous precipitation" is signified the allowing of the ferro salt solution and the ferrocyanide solution to flow into the water present, regardless of whether these solutions are added only in equivalent amounts or in the named slight excess.

The precipitation time is the same as in the previously known processes.

The eventually still to be added potassium or ammonium salt solutions can, as above described, be added after the precipitation but before the aging. However, it can be meaningful to add the exchange salts, i.e. the potassium or ammonium ions to the ferro salt solution.

The intermixing occurs in known manner in the production of the Berlin blue.

The process can be carried out either continuously or batchwise.

The technical advantage of the process of the invention is in the possibility of producing qualitatively especially high substantially improved Berlin blue in comparison to commercial Berlin blue by using a simplified process in reference to the size of the apparatus and expenditure of time.

The blue pigments in the white admixture have a very pure tint, are strongly colored and because of the loose secondary structure and uniform particle shape show improved dispersibility and lower reactability with binders. Because of the pure tint these pigments can replace phthalocyanine blues to a certain extent.

The invention will be understood best in connection with the drawings wherein.

EXAMPLE 1

Figure 1:
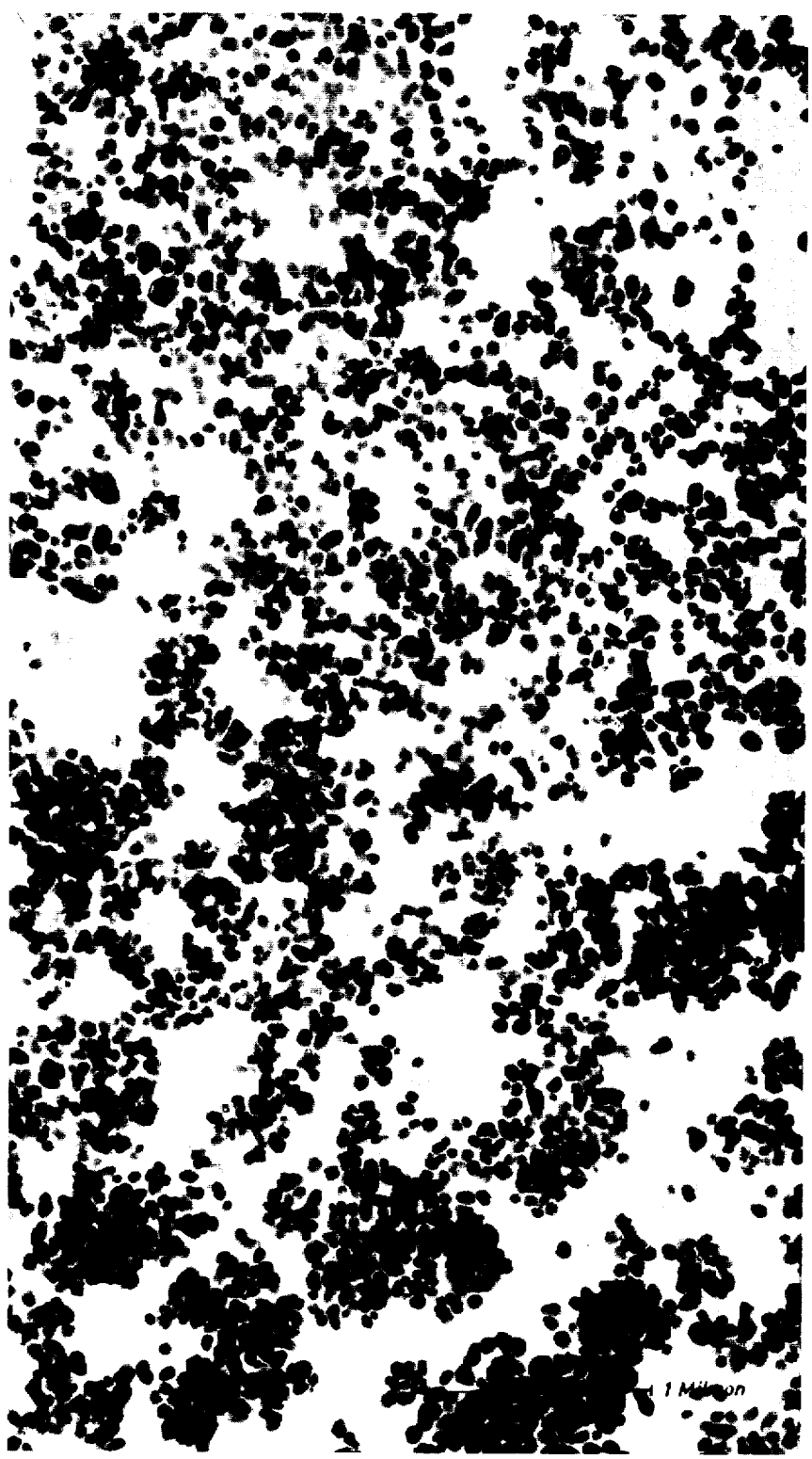
FIG. 1 is an electron microscopic view of particles produced according to Example 3.

In a water receiver having a capacity of 2000 cc at a temperature of 20° C there were simultaneously led in through ring conduits, which are provided with bores, with stirring the following solutions in a precipitation time of 1 hour:

3500 cc of potassium-sodium-hexacyanoferrate solution containing 435 grams of $Na_4[Fe(CN)_6] \cdot 10H_2O$, 380 grams of $K_4[Fe(CN)_6] \cdot 3H_2O$ pH value 4.5 (adjusted by addition of dilute $H_2SO_4$ Temperature 20° C 5000 cc of ferrous sulfate solution containing 670 grams of $FeSO_4 \cdot 7H_2O$ pH value 2.5

Temperature 20° C

During the entire precipitation the same excess of ferrous sulfate was present, namely 3 grams of $FeSO_4 \cdot 7H_2O$ per liter of alkali ferroferrocyanide. The excess of ferrous sulfate was determined by titration of a filtrate sample with $n/10$ $KMnO_4$.

Subsequently the alkali ferroferrocyanide was aged with addition of 20 grams of ammonium sulfate (as salt or in solution) for 1.5 hours at 110° C and 1.5 atmosphere absolute.

The oxidation to alkali ferriferrocyanide (ferrocyanide blue) takes place through addition of 860 cc of hydrochloric acid (concentration 110 grams/liter of HCl and 44 grams of sodium chlorate at a temperature of 65° C.

EXAMPLE 2

In a water receiver having a capacity of 2000 cc at a temperature of 20° C there were simultaneously led in through ring conduits, which are provided with bores, with stirring the following solutions in a precipitation time of 1 hour:

3500 cc of potassium hexacyanoferrate solution containing 760 grams of $K_4[Fe(CN)_6] \cdot 3H_2O$ pH value 4.5 (adjusted by addition of dilute $H_2SO_4$)

Temperature 20° C 5000 cc of ferrous sulfate solution containing 670 grams of $FeSO_4 \cdot 7H_2O$ pH value 2.5

Temperature 20° C

During the entire precipitation time the same excess of ferrous sulfate was present, namely 3 grams of $FeSO_4 \cdot 7H_2O$ per liter of alkali ferroferrocyanide. The excess of ferrous sulfate was determined by titration of a filtrate sample with $n/10$ $KMnO_4$.

Subsequently the alkali ferroferrocyanide was aged with addition of 20 grams of ammonium sulfate (as salt or in solution) for 1.5 hours at 110° C and 1.5 atmospheres absolute in an autoclave.

The oxidation to alkali-ferriferrocyanide (ferrocyanide blue) takes place through addition of 860 cc of hydrochloric acid (concentration 110 grams/liter of HCl) and 44 grams of sodium chlorate at a temperature of 65° C.

EXAMPLE 3

In a water receiver having a capacity of 2000 cc at a temperature of 20° C there were simultaneously led in through ring conduits, which are provided with bores, with stirring the following solutions in a precipitation time of 1 hour:

5250 cc of potassium-sodium-hexacyanoferrate II solution
containing 460 grams of $Na_4[Fe(CN)_6] \cdot 10H_2O$, 400 grams of $K_4[Fe(CN)_6] \cdot 3H_2O$
pH value 8.0
Temperature 20° C
5000 cc of ferrous sulfate solution
containing 700 grams of $FeSO_4 \cdot 7H_2O$
pH value 2.5
Temperature 20° C During the entire precipitation time the excess of [Fe(CN)$_6$] ions is present, namely 7 grams of $K_2Na_2[Fe(CN)_6]$ per liter of alkali ferroferrocyanide.

Subsequently there were added 1500 cc of ferrous sulfate solution (concentration 100g/l of $FeSO_4 \cdot 7H_2O$; pH value 2.5; temperature 20° C) and therewith an excess of 3 grams of $FeSO_4 \cdot 7H_2O$ per liter of alkali ferroferrocyanide provided.

The aging and oxidation took place as in Example 1.

EXAMPLE 4

In a water receiver having a capacity of 2000 cc at a temperature of 20° C there were simultaneously led in through ring conduits, which are provided with bores, with stirring the following solutions in a precipitation time of 1 hour:
3240 cc of calcium hexacyanoferrate II solution
containing 890 grams of $Ca_2[Fe(CN)_6] \cdot 12H_2O$
pH value 10
Temperature 20° C
5000 cc of ferrous chloride solution
containing 730 grams of $FeCl_2 \cdot 4H_2O$
pH value 1.5
Temperature 20° C During the entire precipitation time the same excess of ferrous chloride was present, namely 2.5 grams of $FeCl_2 \cdot 4H_2O$ per liter of ferroferrocyanide. The excess of ferrous chloride was determinated by titration of a filtrate sample with n/10 $KMnO_4$.

Subsequently the ferroferrocyanide was aged with addition of 390 grams of KCl (as salt or in solution) for 1 hour at 96° C and thereby converted into alkali ferroferrocyanide.

The oxidation to alkali ferriferrocyanide (ferrocyanide blue) takes place by addition of 1140 cc of hydrochloric acid (concentration 110g/l of HCl) and 70 grams $NaClO_3$ at a temperature of 65° C.

EXAMPLE 5

In a water receiver having a capacity of 2000 cc at a temperature of 20° C there were simultaneously led in through ring conduits which as provided with bores with stirring the following solutions in a precipitation time of 1 hour:
3240 cc of calcium hexacyanoferrate II solution
containing 890 grams of $Ca_2[Fe(CN)_6] \cdot 12 H_2O$
pH value 10
Temperature 20° C
2800 cc of ferrous-chloride-potassium chloride solution
containing 420 grams of $FeCl_2 \cdot 4H_2O$, 390 grams of KCl
pH value 1.2
Temperature 20° C During the entire precipitation time the same excess of ferrous chloride was present, namely 2.5g/l of $FeCl_2 \cdot 4H_2O$ per liter of white stage. The excess of ferrous chloride was determined by titration of a filtrate sample with n/10 $KMnO_4$.

The further treatment of the white stage, aging and oxidation to Berlin blue took place as in Example 2.

EXAMPLE 6

The procedure was as in Example 5 but the aging was for 1 hour at 96° C.

EXAMPLE 7

The procedure was as in Example 5 except for the addition of 260 grams of KCl in place of 390 grams of KCl for the $FeCl_2$ solution.

EXAMPLE 8

The procedure was as in Example 5 but for preparing the iron II salt solution there were used so called pickling solutions from sewage of pickling plants, containing 10–30% of hydrochloric acid, based on the concentration of ferrous ions. This hydrochloric acid is neutralized on 5–10% of hydrochloric acid — based on the concentration of ferrous ions- by potassium hydroxide. The same amount of potassium chloride as in Example 5 is added to the ferrous chloride solution.

The pigments obtained according to the examples after filtration, drying and grinding to pigment powders were tested according to the stated methods. As comparisons there were used blue pigments which were produced from the same ferrocyanide solutions but after known precipitation processes, i.e. not by simultaneous precipitation test methods.

1. Coloring power — Examination according to DIN 53204 (German Industrial Standard 53204)

|  | RELATIVE STRENGTH OF COLOR |
| --- | --- |
| Pigment of Example 1 | 105% |
| Pigment of Example 2 | 105% |
| Pigment of Example 3 | 105% |
| Pigment of Example 4 | 120% |
| Pigment of Example 6 | 125% |
| Pigment of Example 8 | 125% |

Comparison pigments made by known precipitation processes — relative strength of color — 100%.

2. Dispersibility - Examination by DIN 53239

|  | FOR A GRANULARITY BELOW 5 $\mu$ |
| --- | --- |
| Pigment of Example 1 | 500 revolutions |
| Pigment of Example 2 | 500 revolutions |
| Pigment of Example 3 | 500 revolutions |

Comparison pigments to those of Examples 1–3 made by known precipitation processes — 1000-1200 revolutions for a particle size below 5$\mu$.

Pigment of Example 4—200 times, particle size below 5$\mu$.

Pigment of Example 5—400 revolutions, particle size below 5$\mu$.

Pigment of Example 6—400 revolutions, particle size below 5$\mu$.

Pigment of Example 8—400 revolutions, particle size below 5$\mu$.

Comparison pigments to those of Examples 4–6 made by known precipitation processes — 1200 revolutions, particle size about 10$\mu$, i.e. the fineness of 5$\mu$ was not attained.

3. Reaction behavior

Twenty five grams of ground blue were so made into a paste with linseed oil alkyd resin/linseed oil varnish (1:1) that the paste could be well dispersed on the three rolls. The distribution was checked with the Grindometer. Subsequently so much of the above mentioned mixtures were homogeneously stirred in that the pastes to be tested had the following compositions:

| | |
|---|---|
| 25 | parts blue |
| 75 | parts linseed oil modified alkyd resin/linseed oil varnish, 1:1 |
| 100 | |

The viscosity of the paste was measured soon after the grinding with the Hoppler Rheo-viscosimeter at 20° C (thermostat). The second measurement took place after storage for 24 hours at 50° C in the drying tank. The strength of the reactability was expressed by the more or less strong viscosity increase.

Pigment made by Example 3:

Viscosity increase after 24 hours based on the first measurement = 25%, comparison sample made by known precipitation process:

Viscosity increase after 24 hours based on the first measurement = 50%.

Figure 2:
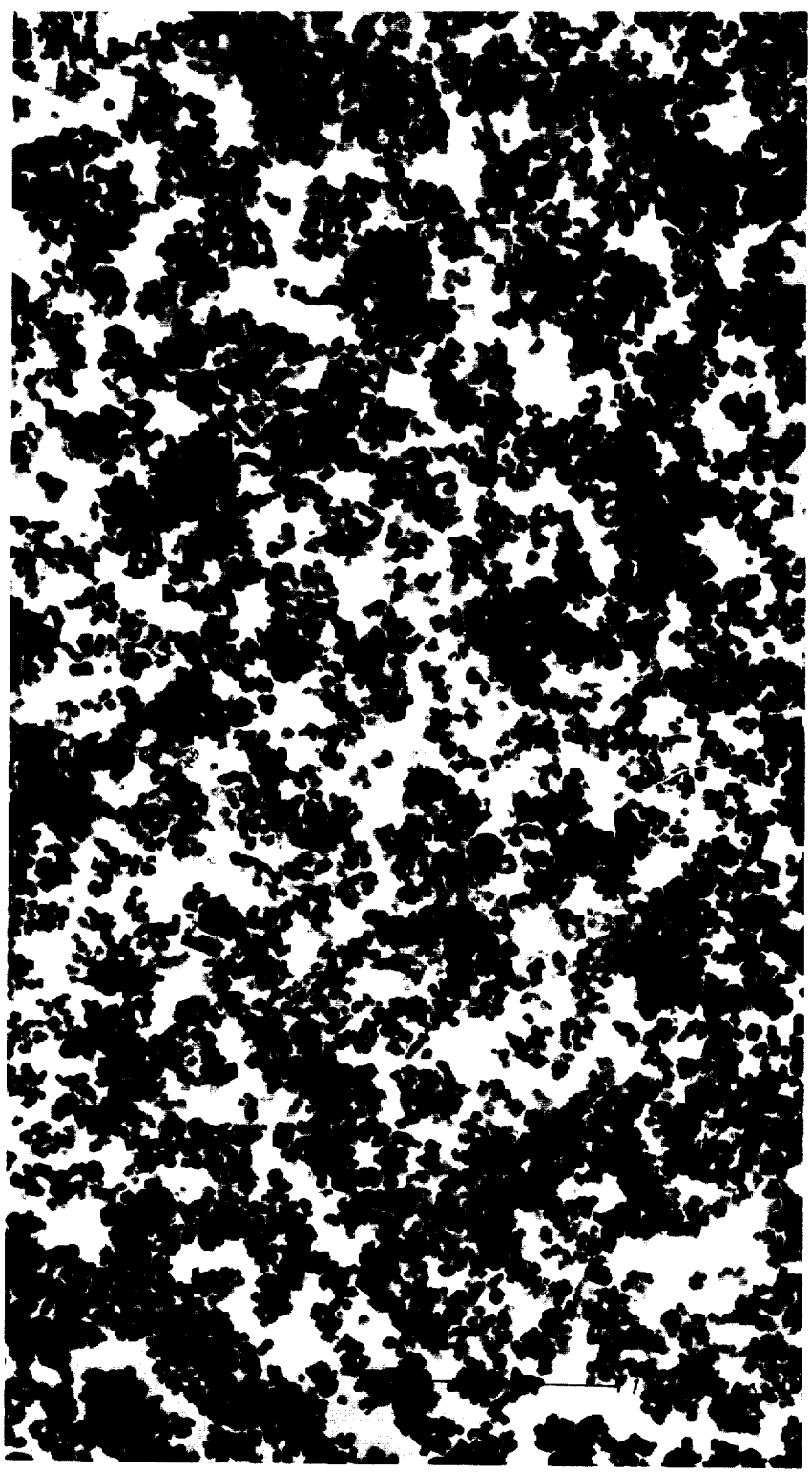
FIG. 2 is an electron microscopic view of prior art particles.

4. The pigment obtained according to Example 3 was additionally investigated electromicroscopically and therethrough there were made visible the almost spherical primary particles and the loose secondary structure in comparison to a pigment produced by known precipitation processes, see FIGS. 1 and 2. FIG. 1 produces the blue made according to Example 3.

The process can comprise, consist of or consist essentially of the steps recited.

What is claimed is:

1. In a process for the production of ferrocyanide blue by reaction of an aqueous ferrocyanide solution with an iron II salt and thereafter aging the precipitate at elevated temperature and oxidizing the aged precipitate to form ferrocyanide blue, the improvement comprising simultaneously introducing an aqueous solution of ferrocyanide consisting of a mixture of sodium and potassium ferrocyanides and an aqueous solution of the ferrous II salt into a water receiver containing water in an amount of 20 to 40 weight % based on the weight of the entire suspension formed to thereby provide optimum mixing and to form a suspension of the precipitate of ferrocyanide white in the resulting aqueous reaction medium, and aging the precipitate in the reaction medium in the presence of the salts formed in the reaction.

2. The process of claim 1 wherein the formation of the ferrocyanide white precipitate and the aging are carried out under superatmospheric pressure.

3. The process of claim 1 wherein the iron II salt is ferrous chloride or ferrous sulfate.

4. The process of claim 23 wherein the pH of the ferrocyanide solution 3.5 to 13 and the pH of the iron II salt solution is 0.8 to 6.

5. The process of claim 4 wherein the reaction is carried out in the presence of a greater than stoichiometric amount of iron salt to provide during and after the precipitation 0.3 to 3 grams of ferrous ion per liter of ferrocyanide white suspension.

6. The process of claim 5 wherein the amount of iron II salt is sufficient to provide 0.6 grams of ferrous ion.

7. The process of claim 4 wherein the reaction is carried out in the presence of a greater than stoichiometric amount of water soluble ferrocyanide to provide during and after the precipitation 0.25 to 20 grams of ferrocyanide ions per liter of ferrocyanide white suspension.

8. The process of claim 4 wherein the iron II salt solution is pickling solution.

9. The process of claim 4 wherein there is added 1/20 to ¼ mole of ammonium ion per mole of ferrocyanide ion in the reaction mixture at a point between the precipitation of the ferrocyanide white and the beginning of the oxidation.

10. The process of claim 9 wherein the amount of ammonium ion is 1/6 to ⅕ mole per mole of ferrocyanide ion in the reaction mixture.

11. The process of claim 1 wherein the precipitation is carried out at 20°-25° C.

12. The process of claim 1 wherein the ferrocyanide employed is a mixture salt of equal molar amounts of sodium and potassium ferrocyanides.

13. The process of claim 12 wherein there is added 1/20 to ¼ mole of ammonium ion per mole of ferrocyanide ion in the reaction mixture at a point between the precipitation of the ferrocyanide white and the beginning of the oxidation.

14. The process of claim 13 wherein the amount of ammonium ion is 1/6 to ⅕ mole per mole of ferrocyanide ion in the reaction mixture.

* * * * *